United States Patent [19]

Crom et al.

[11] 4,169,245
[45] Sep. 25, 1979

[54] SPECTRAL CORRELATION

[75] Inventors: Carol L. Crom, Garland; Carl N. Kelly; Thomas C. Tillotson, both of Greenville, all of Tex.

[73] Assignee: E-Systems, Inc., Dallas, Tex.

[21] Appl. No.: 275,290

[22] Filed: Jul. 26, 1972

[51] Int. Cl.² .......................... G06G 7/19; H04B 7/00
[52] U.S. Cl. .................................. 325/58; 324/77 G; 343/100 CL; 364/604
[58] Field of Search .................... 343/100 CL, 5 DP; 235/181; 324/77 G; 340/15.5 EC; 364/604, 728; 325/58

[56] References Cited

U.S. PATENT DOCUMENTS

| | | | |
|---|---|---|---|
| 3,212,092 | 10/1965 | Anderson et al. | 343/100 CL |
| 3,263,231 | 7/1966 | Smith et al. | 343/100 CL |
| 3,346,862 | 10/1967 | Raudsep | 343/100 CL |
| 3,529,142 | 9/1970 | Robertson | 235/181 |
| 3,718,813 | 2/1973 | Williams, Jr. et al. | 235/181 |

Primary Examiner—Howard A. Birmiel
Attorney, Agent, or Firm—Robert V. Wilder

[57] ABSTRACT

Two signals are correlated in a properly programmed digital computer to render a result reflecting the difference in time of arrival of the two signals at separate receiving stations from a common emitter station. Signals received at each of the receiver stations are converted into digital data and transmitted via a data link to a central correlation station. At the central correlation station, the individual digital signals are checked for magnitude and power content prior to conversion into the frequency domain by a fast Fourier transform. Previously stored calibration data from each of the receiver stations is combined with the frequency domain data to provide corrected information for correlation to determine the difference in time of arrival of signals from a common emitter station.

21 Claims, 9 Drawing Figures

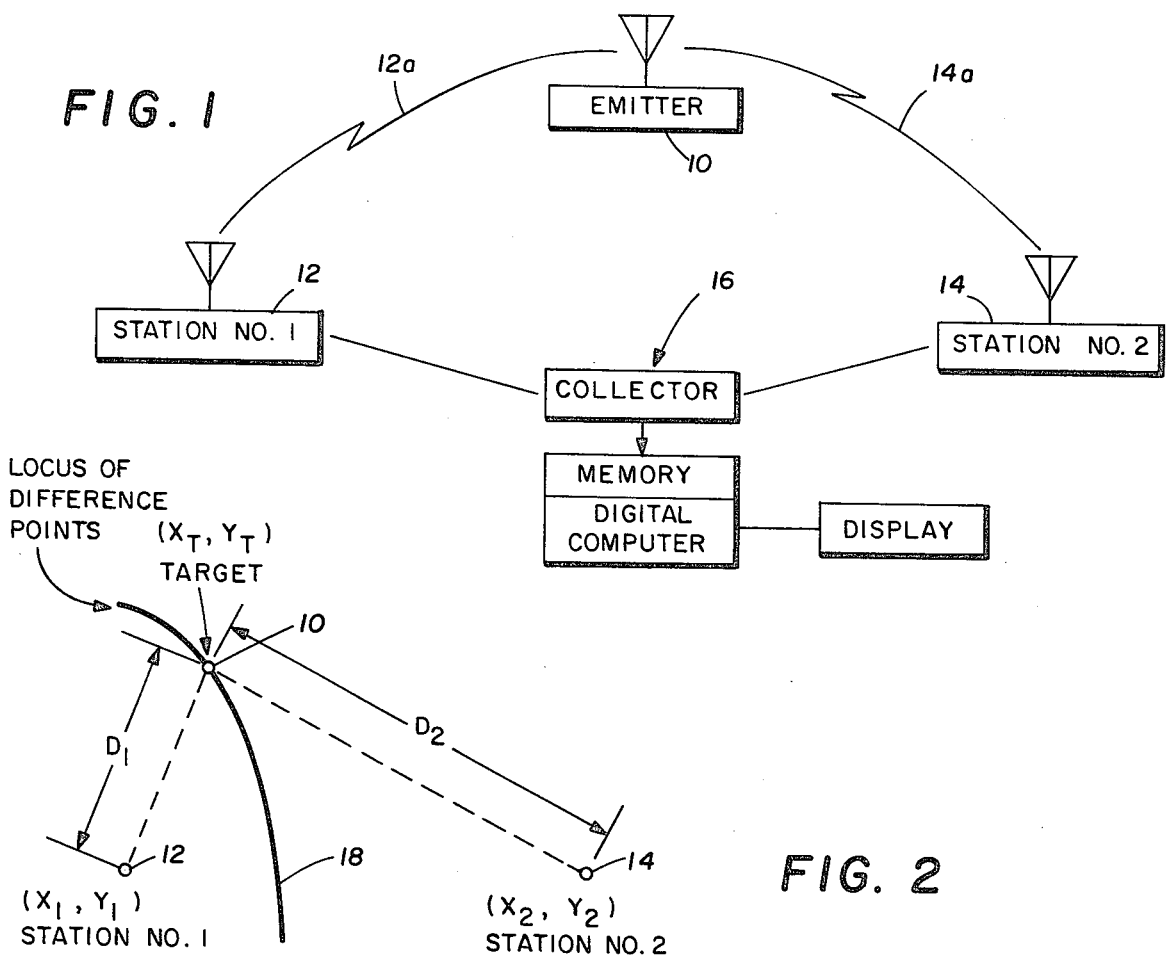
FIG. 1
FIG. 2
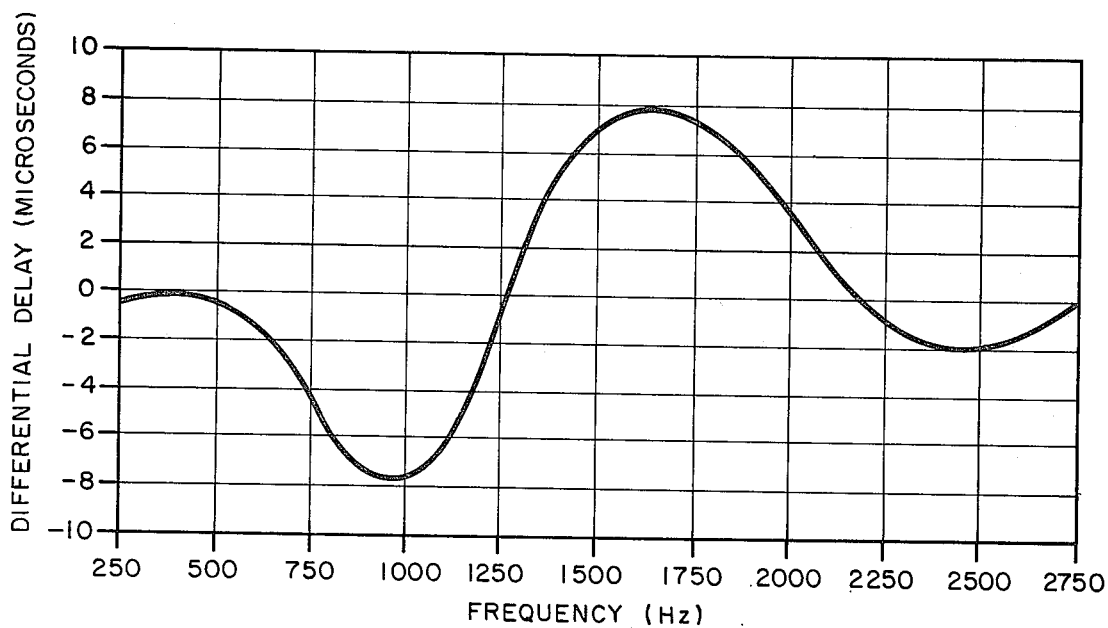
FIG. 4

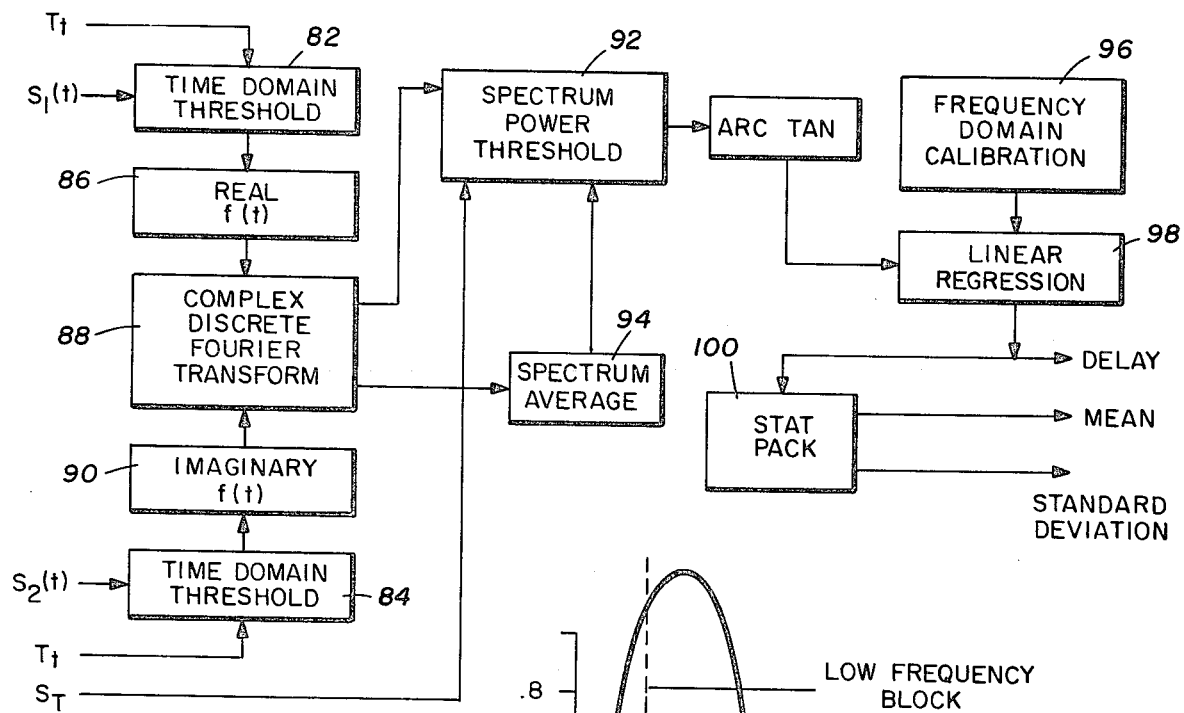
*FIG. 5*
*FIG. 7*
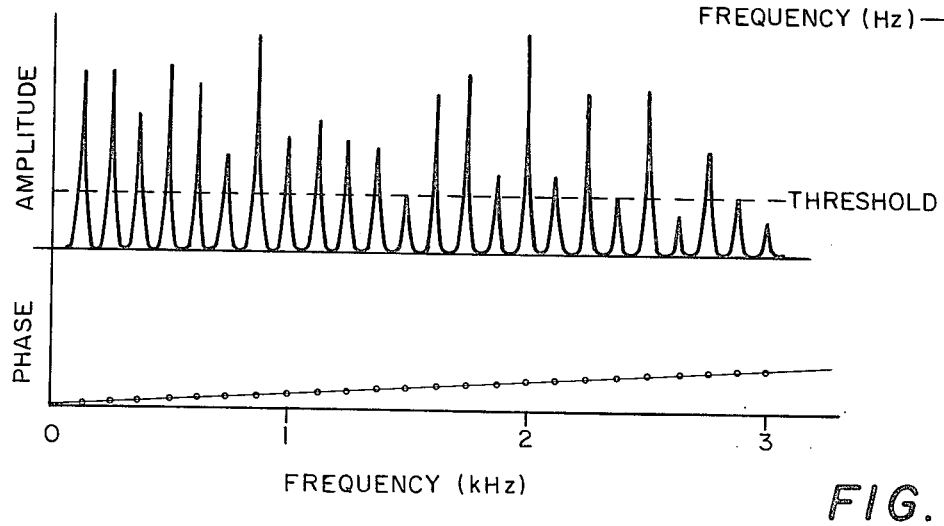
*FIG. 6*

SPECTRAL CORRELATION

This invention relates to correlation techniques and apparatus and more particularly to correlation of signals in the frequency domain.

Time difference of arrival techniques are currently being used in a number of applications for pulse-modulated signals, particularly in the microwave frequency signal region. In these cases, the associated systems provide the receiver bandwidth and fast pulse rise times needed for fractional microsecond time delay measurements as a dividend of the target radar equipment design. Time difference of arrival techniques based on audio delay measurements, however, have not been exploited to date. The extension of pulse-modulated signal techniques to audio-modulated signals within conventional audio bandwidths has achieved limited success because the low-frequency effects of the audio bandwidth tend to interfere with fractional microsecond time correlation as a means of determining the audio delay.

In accordance with the present invention, the time difference of arrival between two wavefronts arriving at two separate receiving stations is calculated by using the audio bandwidth signal. This is identified as Time of Arrival on Audio (TOAOA) and alleviates the low-frequency effects problem and is directly compatible with the digital data links associated with remote collection facilities. The TOAOA approach involves estimating the audio delay in the frequency domain by utilizing the Fast Fourier Transform algorithm and subsequent examination of the resulting spectral analysis. Utilization of digitized audio information further allows some precision in control of the effect of unpredictable phase variations which normally result from receiver IF filter skirts.

Time of arrival on audio (TOAOA) is basically the application of the time difference of arrival (TDOA) in the audio bandwidth. As used in emitter location applications, the TDOA technique takes advantage of the propagation time difference that occurs when a common signal is received at two or more physically separated stations. If the station locations are known, a locus of points exists such that the propagation path distance difference remains constant ($D_2 - D_1$ = constant). This propagation path distance difference is manifested as a time delay between received signals, and is the basic parameter used in systems for emitter location. Three receiving stations are required for such systems to produce instantaneous emitter location information.

The TDOA technique is currently used in a number of applications for pulse-modulated signals, particularly in the microwave frequency signal region. In these applications, the associated microwave techniques provide the receiver bandwidth and fast pulse rise times needed to achieve the fractional microsecond time delay measurement accuracy required for precise emitter location. Use of the TDOA technique in applications involving modulation with information having audio bandwidth has progressed more slowly. The conventional method for estimating the time difference between two separate propagation paths for a common signal has been time domain correlation. With this method, the time difference is the delay at the maximum value of the cross correlation between the two received waveforms. The principal deficiences of the time correlation method in determining fractional microsecond delays are due to the low-frequency effects of the audio bandwidth and the correlation of analog waveforms between remote stations.

An important feature of the present invention is that it does not experience the deficiencies of the time correlation method. The detected audio waveforms are concurrently sampled and digitized, and the sampled data is used to determine the resulting time difference between channels in the frequency domain. The Discrete Fourier Transform of each sampled waveform is calculated using the Fast Fourier Transform algorithm, and subsequent analysis of spectral distributions yields the desired time delay. This method eliminates the low-frequency problem due to the selectivity available through digital filtering. The digitized audio waveforms are also compatible with the digital data links normally required at remote collection sites. In addition, utilization of digitized audio information allows control of the phase variations which normally result from receiver IF filter skirts.

In accordance with the present invention, correlation of a signal and a replica thereof is completed by a method including the steps of generating calibration data for a first channel that includes a receiver and an analog-to-digital converter. Calibration data is also generated for a second channel that includes a receiver and an analog-to-digital converter. A signal at the receiver of the first channel is converted into time based digital data as is a signal at the receiver of the second channel. Both the calibration data and the signal data from each of the channels is converted into a frequency spectrum and this frequency based data is correlated for each channel including the calibration data and the signal data.

Apparatus in accordance with the present invention comprises in combination a first channel including an electromagnetic wave receiver having the signal to be correlated as an input thereto. This first channel also includes circuitry for generating a calibration signal to a second input of the receiver and in addition the first channel includes an analog-to-digital converter responsive to the output of the receiver for producing time related signal data and calibration data. A second channel also includes an electromagnetic wave receiver having a delayed replica of the signal to be correlated as an input thereto. Circuitry for generating a calibration signal connects to a second input of the receiver and an analog-to-digital converter responds to the output of the receiver for producing time related signal data and calibration data. The time related signal data and calibration data is received at a collection station that includes circuitry for converting the time related data into a frequency spectrum for each channel. The collection station further includes circuitry for correlating the frequency spectrum for each channel into a time difference of arrival between audio signals.

A more complete understanding of the invention and its advantages will be apparent from the specification and claims and from the accompanying drawings illustrative of the invention.

Referring to the drawings:

FIG. 1 is a block diagram of two receiving stations and a collector for correlating signals received by each of the two stations from an emitter source;

FIG. 2 is a plot of a locus of points illustrating the time difference of arrival at station 1 and station 2;

FIG. 4 is a plot of differential delay in microseconds as a function of frequency in hertz;

FIG. 5 is a block diagram of the central processor collector station;

FIG. 6 is a plot of the amplitude of a cross spectra versus frequency on an upper plot and the phase of a cross spectra as a function of frequency on a lower plot;

FIG. 7 is a plot of an approximate power spectrum of a speech signal;

Figure 3:
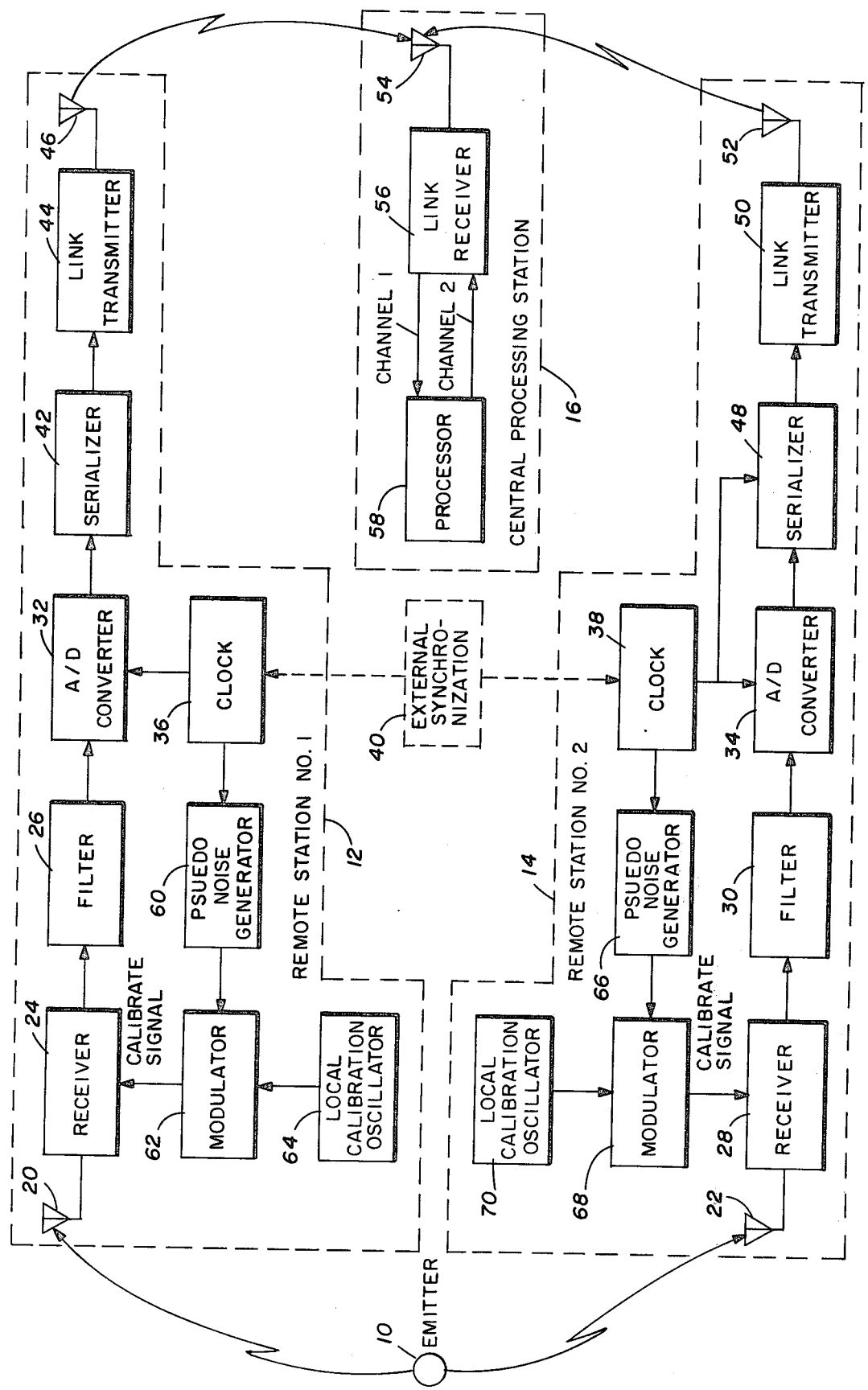
FIG. 3 is a block diagram showing component parts of each of the remote stations 1 and 2 and the central processor collector station.

Referring to the FIGURES, a system for direction finding and location of energy radiating from an emitter 10 is based on relative time of arrival of the radiated energy at two or more remote receiving stations 12 and 14 (airborne or ground) using synchronized digital data links to transmit data containing the information on relative times of arrival of the energy received at the different receiving stations to a central processing collector station 16 where the relative times of arrival are determined by spectral correlation in the frequency domain. If the emitter 10 exists within a specified horizontal plane area for example, one member of a pair of coordinate numbers which gives its location may be deduced from the output of station 12 when compared with the output of station 14. The source can be pinpointed by the use of a third station (not shown) in conjunction with either station 12 or 14 to provide a second coordinate pair. These numbers define an imaginary hyperbola, having the stations 12 and 14 as foci, located in the plane in which the emitter 10 is located. Any signal emitted from the emitter 10 will arrive at station 12 after a time $t_1$ by traveling along the line 12a. The same signal will arrive at the station 14 after a time $t_2$ by traveling along the line 14a.

If the station locations are known, a locus of points (FIG. 2) exists such that the propagation path distance difference remains constant in accordance with the equation:

$$T_d = (D_2 - D_1)/C \qquad (1)$$

where
C = velocity of light,
$T_d$ = propagation time delay difference,
$D_1 = [(X_T - X_1)^2 + (Y_T - Y_1)^2]^{\frac{1}{2}}$, and
$D_2 = [(X_2 - X_T)^2 + (Y_T - Y_2)^2]^{\frac{1}{2}}$ This propagation distance differences is manifested as a time delay between a signal received at the station 12 and a signal received at the station 14 as computed by the collector station 16. Since each of the values of the propagation time delay difference, $T_D$, represents a point on the hyperbola as identified by the numeral 18, to produce instantaneous emitter location information, three receiving stations are required. For purposes of understanding the present invention, however, only a two station correlator will be explained. Information from a third receiving station will be correlated with information from the receiving stations 12 and 14 in the manner to be described based on the two station correlator.

The foregoing procedure is implemented according to a typical embodiment of the present invention by the system as illustrated by the block diagram of FIG. 3 that includes an equipment configuration for a single measurement base line. The system of FIG. 3 is an expansion of that illustrated in FIG. 1 and includes the emitter 10, remote receiving stations 12 and 14 and a central processing collector station 16. Emanations from the emitter 10 are received at an antenna 20 for the remote station 12 and an antenna 22 for the remote station 14. A signal received at the antenna 20 is demodulated from the carrier wave and amplified in a receiver 24 that has an output connected to an aliasing filter 26. Similarly, a signal received at the antenna 22 is demodulated from the carrier frequency and amplified in a receiver 28 that has an output connected to an aliasing filter 30.

Closely matched aliasing filters 26 and 30 are required to have similar bandpass outputs to minimize delay distortion of processed signals. These filters function to pass frequencies within a preselected bandpass; the bandpass being selected to avoid overlap of processed signals.

An output from the filter 26 connects to an analog-to-digital converter 32 wherein a discrete-time (digital) sample of the locally received emanations is generated at an output of a converter. A similar analog-to-digital converter 34 receives an output from the aliasing filter 30 for converting into a discrete-time (digital) sample at the output of the converter.

To synchronize the operation of the converters 32 and 34, a clock 36 provides a reference frequency signal to the converter 32 and a clock 38 provides a synchronizing frequency to the converter 34. The clocks 36 and 38 may themselves be synchronized from an external synchronizing source 40 or may be reference sources to provide accurate, synchronized frequency signals over extended periods of time. For example, certain identified "atomic" clocks are considered to provide the required synchronization for operation of the converters 32 and 34.

To facilitate transmission of the digital data from the converter 32 to the collector station 16, a serializer 42 changes the parallel data from the converter into a serial form for coupling to a data link transmitter wherein the data is modulated for transmission from an antenna 46 to the collector station 16. A serializer 48, coupled to the output of a converter 34, similarly changes the parallel output data into serial form before coupling to a data link transmitter 50 for transmission from an antenna 52 to the central collection station 16.

At the collector station 16, an antenna 54 receives energy from the antennas 46 and 52 for coupling to a data link receiver 56. The data link receiver 56 provides output channels 1 and 2 to a digital processor 58 which may comprise a properly programmed digital computer.

In operation of each of the remote stations 12 and 14, the emitter 10 emanates energy of sufficient magnitude to be measurable at the remote stations. Although the description is based on a radio frequency emitter whereby information is placed onto a radio frequency signal and broadcast via electromagnetic energy, the invention is not intended to be so limited. The radio frequency signals arrive at the antenna 20 of the remote station 12 and the antenna 22 at the remote station 14 whereby the electromagnetic radiations are converted to an electric current by the receivers 24 and 28, respectively.

Considering only remote station 12, the electric current is translated in frequency to an intermediate frequency within the receiver 24 and circuitry may be provided to remove the information from the radio frequency signal. The electric current, hereinafter referred to as the received signal, is then passed through the aliasing filter 26 which restricts the frequency range of the signal in a nearly ideal fashion (no pass band attenuation and a linear phase). From the filter 26, a received signal is converted by the analog-to-digital converter 32 that periodically samples a signal in accordance with the output of the clock 36 to quantize the sample values (amplitude digitizing), thus converting the received signal to a digital-discrete-time signal. The rate of conversion (sample-rate) is determined by the clock 36 which, as explained, is phase synchronized by an external synchronization source 40 to the clock 38 of the remote station 14. In this way, time coherence between the two remote stations is assumed.

Digital signals from the analog-to-digital converter 32, under control of the clock 36, is changed into a serial waveform of contiguous pulses in the serializer 42 in preparation for transmission over a radio frequency link to the central collector station 16. The data link transmitter 44 includes circuitry for placing the contiguous waveform onto a radio frequency signal (carrier) and the modulated carrier is converted into electromagnetic radiation at the antenna 46 for transmission to the central collector station 16. It should be understood, that the data link transmitter 44 may, instead of providing a carrier frequency, comprise circuitry for a direct line coupling to the central collector station 16.

At the collector station 16, the electromagnetic radiation is received at the antenna 54 and converted back to an electric current. The data link receiver 56 extracts the contiguous data pulses from the carrier (demodulation) and conditions the digital data for processing in the digital processor 58. It is at this point that the two contiguous data streams from each of the two remote stations 12 and 14 is merged for coupling to the digital processor 58.

The electric current in the receiver 28 is translated in frequency to an intermediate frequency within the receiver to provide information from the radio frequency signal, if required. The electric current (received signal) from the receiver 28 is also coupled to the filter 30 which restricts the frequency range of the signal in the same nearly ideal fashion as the filter 26. At the analog-to-digital converter 34, the received signal is periodically sampled in response to synchronizing pulses from the clock 38 to quantize the sampled values thus converting the received signal into a digital-discrete-time signal.

The rate of conversion is controlled by the clock 38 and the digital signal from the converter, under control of the clock 36 is changed into a serial waveform of continuous pulses in the serializer 48. The data link transmitter 50 places the contiguous waveform onto a radio frequency signal and this modulated signal is converted into electromagnetic radiation at the antenna 52. Electromagnetic radiation from the antenna 52 is received at the antenna 54 of the collector station 16 where it is converted back to an electric current for coupling to the digital processor 58. The digital processor 58 accepts a sample from each of the two data channels and provides processing to estimate the time difference of arrival of the electromagnetic emanations from the emitter 10 at the remote stations 12 and 14.

Due to the non-ideal nature of the electronic systems, amplitude and phase distortion are introduced on the received signal at each of the remote stations 12 and 14 as it is processed through the various station circuit components; thus subjecting the system to erroneous time difference of arrival measurements. By purposely rejecting the received electromagnetic energy at the antennas 20 and 22 at the respective remote stations 12 and 14, and by properly injecting a suitable calibration signal into each of the receivers 24 and 28, a calibration of the system to determine the amplitude and phase distortion introduced into the respective signals is made. A signal with known characteristics is introduced into each of the receivers 24 and 28 and a record of the distortion as a function of frequency is obtained. This calibration record is stored and subsequently used to correct for distortion in the actual emitter emanations.

Since the remote stations 12 and 14 are usually widely separated, it is not practical to provide a single calibration signal to each receiver. However, since each of the remote stations 12 and 14 are operated in synchronism by means of the clocks 36 and 38, locally generated synchronous calibration signals possess the desired characteristics of being identical at each location. As an example of a synchronous calibration signal, the so called pseudonoise signal is generated by coupling the output of the respective clocks 36 and 38 to a digital logic device that produces a periodic sequence of digital pulses.

With reference to the remote station 12, an output of the clock 36 is applied to the pseudonoise generator 60 having an output coupled to a modulator 62. Also coupled to the modulator 62 is an oscillator 64 that provides a carrier frequency for modulating the output pulses from the generator 60. This radio frequency signal is then injected into the receiver 24 (the signal from the emitter 10 is blocked out) where it is operated on in a manner identical to the received emanations from the emitter 10. In this manner, there is provided a record of distortion versus frequency in the digital processor 58 for correction of difference of time delay information.

With reference to the remote station 14, the clock 38 provides frequency pulses in synchronism with the clock 36 to a pseudonoise generator 66 having an output coupled to a modulator 68. Also coupled to the modulator 68 is an oscillator 70 providing a carrier frequency for the output pulses of the generator 66 whereby the calibration signal is modulated with the oscillator signal. This radio frequency signal is then injected into the receiver 28 (the signal from the emitter 10 is blocked out) where it is operated on in a manner identical to the received emanations from the emitter 10. Again, a record of distortion versus frequency for the remote station 14 is provided within the digital processor 58 for data correction.

A typical frequency domain calibration curve representing data correlated from the remote stations 12 and 14 during the calibration cycle and stored in the digital processor 58 is illustrated in FIG. 4. It will be seen that if a straight line fit of this data is made for averaging the electronic system distortion, considerable error will result thus effecting the ultimate accuracy of the time delay measurement. If however, a replica of this calibration curve is stored in memory and used to correct the received signal data, the resulting error can be significantly reduced.

To produce this calibration data, it is preferred to generate a waveform with a harmonic content at preselected intervals that is properly phased to obtain the maximum power within amplitude constraints. Such a waveform is the maximal length shift register sequence commonly identified as a pseudonoise waveform. This waveform is generated in the pseudonoise generators 60 and 66 at the output of an N-bit shift register, and normally provides $2^N$ separate states prior to repeating.

By properly interconnecting the N-bit shift register, the output sequence of the pseudonoise generators 60 and 66 may be represented by an autocorrelation function wherein, first, most of the power is concentrated in the band $f=1/\Delta T$ (A selection of the bandwidth, therefore, depends only on the clock frequency) and second, the frequency spacing, dictated by the $\Delta$ function series, is dependent on the product $m\Delta T$. By appropriate choices of time period $\Delta T$ and sequence length m, therefor, wide combinations of bandwidth and frequency spacing can be obtained.

As an example, the pseudonoise generators 60 and 66 are based on a $m=2^N$ bit sequence with $\Delta T=125$ microseconds, and synchronized with the analog-to-digital converter in each of the respective remote stations by a means of the channel clock. The sequence length is defined by:

$$m = 8 \text{ kHz}/\Delta f = 8 \text{ kHz}/125 \text{ Hz} = 64 \quad (2)$$

requiring only a six bit shift register.

Calibration data stored in the digital processor 58 is stored in memory until called for by the calibration program routine of the processor. The particular time at which this data is required by the digital processor 58 will be explained.

In accordance with the present invention, the time of arrival of audio is based on a system performing audio delay measurements in the frequency domain. This approach is based on the assumption that the demodulated waveforms coupled to the digital processor 58 can be decomposed into sinusoids of fixed frequencies such that the time difference can be obtained by measuring the phase difference between them. In the digital processor 58, each demodulated waveform is separated into its spectral components and the phase difference measured for each frequency. The time difference between the two signals at the antennas 20 and 22 is obtained by properly combining each of the component frequencies. The phase difference for a distortionless time delay will actually be a linear function of frequency represented by a straight line, the slope of which is resulting time difference.

To provide the spectral components of each sampled audio waveform the discrete Fourier transform is generated by using a fast Fourier transform algorithm. To eliminate unwanted frequency components from the remote station data, ideal bandpass filtering is effected by simply neglecting unwanted frequency components. The resulting spectral distributions are then used by the digital processor 59 to calculate the phase spectrum which represents the phase difference between spectral components of like frequency. This phase difference, as a function of frequency, is represented in each complex spectral component by the cross-power spectrum between signals from the stations 12 and 14. The cross-power spectrum represents the Fourier transform of the time domain crosscorrelation function. By taking the arc-tangent at each spectral component of the cross-power spectrum, the actual phase difference is obtained. Finally, the digital processor 58 performs a slope calculation on the resulting phase spectrum to determine actual time delay.

The interrelationship of the time of arrival of audio processing by the digital processor 58 is illustrated in FIG. 5 wherein each of th blocks represent a separate processing function of the digital processor 58.

In any system with a finite memory, the length of the data record is limited, typically to 2048 samples per channel. As an example, for an 8 kHz sample rate and a bandwidth of 3 to 4 kHz, only 256 milliseconds of data is accepted by the digital processor 58. This is approximately equivalent to a spoken syllable and thus many data records from the remote stations 12 and 14 will contain a pause and are not processable. To establish whether a particular set of data should be processed, initially the digital processor 58 completes a time domain threshold function and a saturation level threshold function as identified by the reference numeral 82 for the information from the remote station 12 and the reference numeral 84 for information from the remote station 14. Time domain threshold processing provides a measure of a signal level in each channel from the data link receiver 56 and compares it against an established level. If the measured level does not exceed the threshold value, the particular data record is discarded and the processing cycle reinitiated to accept new data from each of the remote stations 12 and 14. Preferably, the level test is performed on the average absolute value of the signal from each of the remote stations and can be accomplished with either external hardware or with fixed point arithmetic processing. With regard to the saturation level threshold function, the signal level in each channel is compared with a maximum value. If the signal level exceeds this upper limit the data is discarded as the system may saturate. This latter threshold prevents unwanted clipping of the signal. The establishment of a threshold setting is based upon a leveling scheme to maintain a near full-scale value for the audio signal. A criteria is to select a threshold value that is insensitive to noise and determine the required signal level to pass this threshold test.

If the data is accepted by the magnitude threshold check, the samples from each remote station are multiplied by a window function in the discrete time domain. FIG. 5 shows a fast Fourier transform being applied to each channel of the audio delay measurement system. However, a single complex fast Fourier transform may be performed only once. This is accomplished by completing a complex time series function as identified by the reference numerals 86, 88 and 90. This complex time series is given by:

$$f(N) = \sum_{n=0}^{N} [X_1(nT) + jX_2(nT)] \quad (3)$$

where $X_1(.)$ and $X_2(.)$ are the two input data samples from the remote stations 12 and 14, respectively. A single discrete Fourier transform suffices to achieve the cross spectrum. Denoting the discrete Fourier transform of the equation (3) by S(i), $$S(i) = DFT\left\{\sum_{n=0}^{N} [X_1(nT) + X_2(nT)]\right\} = F_1(i) + jF_2(i) \quad (4)$$

$$= [Re\, F_1(i) - Im\, F_2(i)] + j\,[Im\, F_1(i) + Re\, F_1(i)]$$
$$L = 0, 1, 2, \text{---}N\text{-}1$$

where $F_1(i)$ and $F_2(i)$ are the discrete Fourier transforms of $$\sum_n X_1(nT) \text{ and } \sum_n X_2(nT)$$

at frequency point i, respectively. The real parts of $F_1(n)$ and $F_2(n)$ are symmetric about N/2, while the imaginary parts are anti-symmetric. This property is then used to obtain the individual spectra from the composite equation (4) to yield:

$$F_1(i) = \tfrac{1}{2}[S(i) + S^*(n-i)]$$

$$F_2(i) = j/2[S(n-i) - S^*(i)] \quad (5)$$

$$i = 0, 1, 2 \ldots N/2$$

which is verifiable by direct substitution. The discrete Fourier transform is taken of the combined data and the results maniuplated to form real and imaginary arrays of the cross spectrum. Separate arrays of the real and imaginary part of the average cross spectrum are determined on a running basis.

A complex waveform will have regions of frequency containing little or no signal energy. The frequency points used in the phase slope calculation to determine the time of arrival delay, therefore, must be carefully selected. This selection is performed in the digital processor 58 by a function identified by the reference numeral 92.

Referring to FIG. 6, there is shown a cross spectrum of two time series (such as from the remote stations 12 and 14) in polar form, the upper trace is the amplitude spectra, while the lower trace is the phase spectra. The phase spectra is obtained by considering only the frequency components within a given dB level of the maximum, and encompasses almost all of the available signal energy. The selected dB threshold effectively eliminates all frequencies not containing a signal component. Thus, to establish a power spectrum threshold value for use in the digital processor 58, the component of the discrete frequency spectrum with a maximum mangitude as found and the threshold value established at a specified number of decibels relative to the maximum.

In addition to spectrum thresholding, the function 92 accomplishes filtering by ignoring unwanted frequency bands. In the use of a digital computer for the processor 58, this ideal filtering is accomplished by ignoring certain memory data. Ideal filtering is useful for removing the band edge effects and may typically be set to cut off frequencies below 0.25 kHz and above 3 kHz.

Because of the short record length of data from the remote stations 12 and 14 (64 to 256 milliseconds), an improvement in accuracy of the measurement is obtained by averaging the amount of data obtained in a short broadcast time (1 to 2 seconds). Spectrum averaging, as identified by the block 94, reduces the RMS error. Since from four to thirty-two distinct data records are available (depending on the record length), the minimum reduction in RMS error is one-half. By implementing the following expression:

$$\tau_{ave} = \frac{1}{m} \sum_{i=1}^{m} \tau i \quad (6)$$

averaging the data will yield a reduction in RMS error by $1/\sqrt{m}$ while obtaining an average cross spectrum that will yield at least this amount and perhaps more. In experimental evaluation of a system in accordance with the present invention, it has been observed that spectral averaging reduces the RMS error by approximately $1\sqrt{3m/2}$, which is the value for the so-called "Bartlett Window." For a full discussion of the "Bartlett Window" concept, reference is made to the text "Spectral Analysis and its Applications", by Gwilym M. Jenkins and Donald G. Watts, Chapter 6, published by Holden-Day (1968).

Following threshold processing, the phase of the cross spectrum is computed and corrected by the calibration data for each discrete frequency component whose magnitude exceeds the cross spectrum magnitude threshold. Frequency domain calibration data, as stored in the memory 96, is illustrated by the plot of differential delay as a function of frequency in FIG. 4. Calibration data as stored in the memory 96 is used to correct each discrete frequency component by using a linear regression algorithm as identified by the function 98. Delay is estimated by fitting the best straight line to the data in the phase-frequency plane in the minimum means squared error sense. The corrected phase spectra can be modeled by the linear relation:

$$\theta(w_i) = \tau w_i \quad (7)$$

where $\theta(.)$ is the phase, $\sigma$ the delay and $w_i$ the frequency. This relationship is used in determining the mean squared error as follows:

$$\epsilon = \frac{1}{N_1} \sum_{i=1}^{N_1} [Y(w_i) - \theta_c(w_i) - \tau w_i] \quad (8)$$

where the noisy phase measurement, $Y(w_i)$; the calibration curve, $\theta_c(w_i)$; and $N_1$ values where $N_1$ is less than N/2, the total number of measurement frequencies, are known values and the value, $\tau$, is such that the mean-squared error, $\epsilon$, is minimized. By taking the partial derivative of equation (8) with respect to $\tau$, setting it equal to zero, and solving for $\tau$, $$\tau = \frac{\sum_{i=1}^{N_1} [Y(w_i) - \theta_c(w_i)] w_i}{\sum_{i=1}^{N_1} w_i^2} \quad (9)$$

then calibration is accomplished by the linear regression algorithm. In this program, delay estimates are made for all single records and for the average cross spectrum of all records meeting the saturation and magnitude threshold constraints.

Following the linear regression a statistical function 100 is completed as an analysis routine for calculating the mean and RMS variation from the individual and average delay estimates. An output of the linear regression represents the delay in the time of arrival of audio at the remote station 12 with respect to the remote station 14. From the statistical processing 100, the mean and standard deviation of these value are calculated.

Completing the various functions of the digital processor 58 as shown in FIG. 5 is made by a properly programmed digital computer. A Fortran listing of one such program for the delay estimation is given in Table I, wherein the instruction numbers do not correspond to the reference numerals in the Figures.

TABLE I

```
      DIMENSION NWAV1(1024),NWAV2(1024),NFTR1(512),NFTI1(512)
      DIMENSION NFTR2(512),NFTI2(512),CALIB(512)
      DIMENSION SVWV1(512), SVWV2(512)
      DIMENSION WAVE1(1024), WAVE2(1024)
      DIMENSION FTR2(512), FTI2(512)
      COMMON NWAV1,NWAV2,NFTR2,NFTI2,CALIB,LEN1,LEN2,NPHSE,N
      COMMON NLLAY,LNGTH,NROUT,LONG,NEXP,INCRD,INCRT,NTRVL,NRUN
      COMMON NDUMY
      EQUIVALENCE(NWAV1(1),NFTR1(1)),(NWAV2(1),NFTI1(1))
      EQUIVALENCE(NWAV1(1), WAVE1(1)),(NWAV2(1), WAVE2(1))
      EQUIVALENCE (NFTR2(1),FTR2(1)),(NFTI2(1),FTI2(1))
      REWIND 1
      READ(1) CALIB
      REWIND 2
      N=0
      LNGTH=1024
      LEN=LNGTH/2
      LIM1=250

LIM2=3000
      DB=26.0
      TDB=15.0
      NBITS=11
      MXSAT=1
      IFS=8000
      LOWER=FLOAT(LIM1)*FLOAT(LNGTH)/FLOAT(IFS)
      NUPER=FLOAT(LIM2)*FLOAT(LNGTH)/FLOAT(IFS)
      NREC=8
      NTRVL=125
      NEXP=10
C
C     READ REC FROM TAPE AND PROCESS
C
  100 READ(2) (NWAV1(I),I=1,512)
      READ(2) (NWAV2(I),I=1,512)
      READ(2) (NWAV1(I),I=513,1024)
      READ(2) (NWAV2(I),I=513,1024)
C
C     UTILIZE SATCK TO PERFORM SATURATION CHECK
C
C     NPASS = 0 IS ACCEPTABLE
C     NPASS = 1 IS UNACCEPTABLE
C
      CALL SATCK (NPASS,NWAV1,LNGTH,NBITS,MXSAT)
      IF(NPASS) 100,105,100
  105 CALL SATCK (NPASS,NWAV2,LNGTH,NBITS,MXSAT)
      IF(NPASS) 100,110,100
C
C     UTILIZE PRWCK TO PERFORM MAGNITUDE CHECK
C
C     NPASS = 0 IS ACCEPTABLE
C     NPASS = 1 IS UNACCEPTABLE
C
  110 CALL PRWCK (NPASS,NWAV1,LNGTH,DB)
      IF(NPASS) 100,115,100
  115 CALL PRWCK (NPASS,NWAV2,LNGTH,DB)
      IF(NPASS) 100,120,100
C
C     PERFORM CROSS SPECTRAL TRANSFORM
C
  120 XN=LNGTH
      DO 125 I=1,LNGTH
      XI=I
      WINDO=0.5-(0.5*COS(2.0*3.14159*XI/XN))
      NWAV1(I)=FLOAT(NWAV1(I))*WINDO
      NWAV2(I)=FLOAT(NWAV2(I))*WINDO
  125 CONTINUE

CALL CRSPC
C
C     IF FIRST SET STORE IN SAVE OTHERWISE AVERAGE
C
```

```
      N=N+1
      IF(N-1) 170,150,170
150   DO 160 I=1,LEN
      SVWV1(I)=WAVE1(I)
      SVWV2(I)=WAVE2(I)
160   CONTINUE
      GO TO 200
C
*
C     RUN PRESENT DATA IN SAVE ARRAYS THROUGH AVERAGING FORMULA
C     AND COMBINE WITH DATA FROM THIS PASS
C
170   DO 180 I=1,LEN
      XNUM= WAVE1(I)+(SVWV1(I)*FLOAT(N-1))
      SVWV1(I)=XNUM/FLOAT(N)
      XNUM=WAVE2(I)+(SVWV2(I)*FLOAT(N-1))
      SVWV2(I)=XNUM/FLOAT(N)
180   CONTINUE
C
C     CALCULATE TAU FROM THIS DATA SET
C
200   CALL TAW(WAVE2,LOWER,NUPER,LEN,TAU,NTRVL,TDB,LNGTH,WAVE1,CALIB)
      WRITE(50,203) TAU
203   FORMAT(/,23HTAU FOR THIS DATA SET =,F10.4,/)
C
C     IF END OF DATA TERMINATE
C
      IF(N-NREC) 100,205,205
C
*
C     CALCULATE TAU FOR AVERAGE
C
205   CALL TAW(SVWV2,LOWER,NUPER,LEN,TAU,NTRVL,TDB,LNGTH,SVWV1,CALIB)
      WRITE(50,210) TAU
210   FORMAT(/,29HAVERAGE TAU FOR THESE SETS =,F10.4,/)
      STOP
      END
*
      SUBROUTINE CRSFC
      DIMENSION NWAV1(1024),NWAV2(1024),NFTR1(512),NFTI1(512)
      DIMENSION NFTR2(512),NFTI2(512),CALIB(512)
      DIMENSION WAVE1(1024), WAVE2(1024), FTR1(512),FTI1(512)
      DIMENSION FTR2(512), FTI2(512)
      COMMON NWAV1,NWAV2,NFTR2,NFTI2,CALIB,LEN1,LEN2,NPHSE,N
      COMMON NDLAY,LNGTH,NROUT,LONG,NEXP,INCRD,INCRT,NTRVL,NRUN
      COMMON NDUMY
      EQUIVALENCE (NWAV1(1),NFTR1(1)),(NWAV2(1),NFTI1(1))
      EQUIVALENCE (NWAV1(1),WAVE1(1)), (NWAV2(1),WAVE2(1))
      EQUIVALENCE (NFTR1(1),FTR1(1)), (NFTI1(1),FTI1(1))
      EQUIVALENCE (NFTR2(1),FTR2(1)),(NFTI2(1),FTI2(1))
C
      NFLAG=1
      DO 11 I=1,LNGTH
      WAVE1(I)=NWAV1(I)
      WAVE2(I)=NWAV2(I)
11    CONTINUE
      CALL XFORM(WAVE1, WAVE2,LNGTH,NEXP,NFLAG)
      NN=LNGTH/2
*
C
C     THE AMOUNT OF DATA IN WAVE1 AND WAVE2 TO BE USED SHOULD BE
C     THE FIRST 1/2 OF THE ARRAY. LNGTH IS THE FULL SIZE.
C
C     CALCULATE F1 IN  FTR1, G1 IN   FTI1, F2 IN  FTR2, G2 IN   FTI2.
C
12    FTR1(1)=WAVE1(1)
      FTI1(1)=WAVE2(1)
      FTR2(1)=WAVE2(1)
      FTI2(1)=-WAVE1(1)
      DO 20 I=2,NN
      NSUB=LNGTH-I+2
15    F1=0.5*(WAVE1(I)+WAVE1(NSUB))
      G1=0.5*(WAVE2(I)-WAVE2(NSUB))
      F2=0.5*(WAVE2(I)+WAVE2(NSUB))
      G2=0.5*(WAVE1(NSUB)-WAVE1(I))
```

```
              FTR1(I)=F1
              FTI1(I)=G1
              FTR2(I)=F2
              FTI2(I)=G2
C     CALCULATE MAGNITUDE IN  FTR2 AND PHASE IN  FTI2
C     SAVE REAL VALUES IN WAVE1 AND IMAG IN WAVE2.
C
      DO 50  I=1,NN
        REAL=( FTR1(I)* FTR2(I))+( FTI1(I)* FTI2(I))
      XIMAG=(FTI1(I)*FTR2(I))-(FTR1(I)*FTI2(I))
      WAVE1(I)=REAL
      WAVE2(I)=XIMAG
      FTR2(I)=SQRT(REAL**2+XIMAG**2)
      FTI2(I)=ATAN(XIMAG/REAL)
   40 IF(REAL) 50,50,42
   42 IF(XIMAG) 45,50,47
   45 FTI2(I)=FTI2(I)-3.14159
      GO TO 50
   47 FTI2(I)=FTI2(I)+3.14159
   50 CONTINUE
  300 RETURN
      END
*
      SUBROUTINE XFORM(F,G,NUM,NEXP,IFLAG)
      DIMENSION F(1),G(1),S(512),C(512),NF(10),NR(10)
C
C
C
C
C        INPUT - OUTPUT PARAMETERS
C
C
C     F     IN-OUT --- REAL COMPONENTS OF VALUES
C
C     G     IN-OUT --- IMAGINARY COMPONENTS OF VALUES
C
C     NUM   INPUT - TOTAL NO OF ELEMENTS IN F OR G ARRAY, POWER OF 2
C
C     NEXP  INPUT - EXPONENT OF 2 WHICH YIELDS 'NUM'
C
C     IFLAG INPUT - FLAG WHICH HAS SOME INTEGER VALUE. IF FLAG IS
C                   POSITIVE, THE S AND C ARRAYS ARE DETERMINED AND
*
C                   STORED. IF IFLAG IS 0 OR -, S AND C ARE NOT COMPUT-
C                   ED. IFLAG SHOULD BE POSITIVE THE FIRST TIME XFORM IS
C                   CALLED IN A GIVEN ROUTINE AND SHOULD BE - OR 0
C                   ON SUBSEQUENT CALLS OF THIS ROUTINE.
C
C         NF   BIT REVERSING INDEX. DIMENSION BY 10
C
C         NR   BIT REVERSING INDEX. DIMENSION BY 10
C
C
C
      CONST =1./4096.0
C
C     GENERATE BIT REVERSING INDEXES
C
      JJ=NEXP
      II=1
      DO 1 I=1,NEXP
      NF(I)=II
      NR(JJ)=II
      II=II+II
    1 JJ=JJ-1
*
C     BIT REVERSE INPUT DATA ARRAY
C
      DO 11 I=1,NUM
      II=I-1
      KK=1
      DO 7 J=1,NEXP
      JJ=II-NR(J)
      IF(JJ) 7,3,5
    3 KK=KK+NF(J)
      GO TO 9
```

```
5      II=JJ
       KK=KK+NF(J)
7      CONTINUE
9      IF(I-KK) 10,10,11
10     X=F(I)
       Y=G(I)
       F(I)=F(KK)
       G(I)=-G(KK)
       F(KK)=X
       G(KK)=-Y
11     CONTINUE
*
C
C      GENERATE SIN AND COS ARRAYS BY DIRECT METHOD
C
       IF(IFLAG) 14,14,12
12     II=NUM/4
       INUM = NUM/2
       INUM = INUM+2
       JNUM = II+1
       JJ=II+2
       ANUM = NUM
       X=6.283185/ANUM
       Y=X
       C(1)=1.0
       C(JNUM)=0.0
       S(1)=0.0
       S(JNUM)=1.0
       DO 13 I=2,II
       C(I) =COS(X)
       INU = INUM-I
       IIPI = II+I
       JJMI = JJ-I
       C(INU)= -C(I)
*
       S(IIPI)= C(I)
       S(JJMI)= C(I)
13     X=X+Y
C
C      COMPUTE THE FOURIER COEFFICIENTS
C
14     DO 15 I=1,NUM,2
       JJ=I+1
       X=F(JJ)
       Y=G(JJ)
       F(JJ) =(F(I)-X)*CONST
       G(JJ) =(G(I)-Y)*CONST
       F(I)  =(F(I)+X)*CONST
15     G(I)  =(G(I)+Y)*CONST
       L=2
       N=4
       DO 21 K=2,NEXP
       M=1
       II=1
       DO 19 J=1,L
       DO 17 I=M,NUM,N
       JJ=I+NF(K)
*
       X=F(JJ)*C(II)+G(JJ)*S(II)
       Y=G(JJ)*C(II)-F(JJ)*S(II)
       F(JJ)= F(I)-X
       G(JJ)= G(I)-Y
       F(I) = F(I)+X
17     G(I) = G(I)+Y
       II =   II + NR(K)
19     M=M+1
       L=N
21     N=N+N
       RETURN
       END
*
       SUBROUTINE TAW(ARRAY,NFRST,NUPER,NLEN,TAU,NTRVL,DB,LNGTH,XMAG
      1,CALIB)
       DIMENSION ARRAY(1),XMAG(1),CALIB(1)
```

```
C
C      THIS ROUTINE WILL CALCULATE A VALUE OF TAU FROM THE VALUES
C      PASSED IN ARGUMENTS. THE ANSWER WILL GO IN TAU FOR USE BY
C      THE CALLING ROUTINE. THE START AND STOP VALUES ARE SET AS
C      VARIABLES SO THAT SECTIONS OR ENTIRE ARRAYS MAY BE USED
C      WITH EQUAL EASE.

TOP=0.0
       BOTOM=0.0
       RESOL=1.0/(FLOAT(LNGTH)*FLOAT(NTRVL))
       EXPON=-DB/10.0
       BIG=0.0
       NN=LNGTH/2
       DO 5 I=2,NN
       TEST=SQRT(XMAG(I)**2+ARRAY(I)**2)
       IF(TEST-BIG) 5,5,3

3 BIG=TEST

5 CONTINUE
       XLINE=BIG*(10.0**EXPON)
       DO 20 I=NFRST,NUFER

RLMAG=SQRT(XMAG(I)**2+ARRAY(I)**2)
       IF(RLMAG-XLINE) 20,20,10

10 PHI=ATAN(ARRAY(I)/XMAG(I))
       IF(XMAG(I)) 16,16,11

11 IF(ARRAY(I)) 12,16,13

12 PHI=PHI-3.14159
       GO TO 16

13 PHI=PHI+3.14159

C
C      THIS POINT IS ABOVE THRESHOLD LINE.
C

16 N=I-1
       PHI=PHI+CALIB(I)
       OMEGA=2.0*3.14159*FLOAT(N)*RESOL
       TOP= TOP+PHI*OMEGA
       BOTOM= BOTOM+OMEGA**2

20 CONTINUE

C
C      CALCULATE TAU FROM SUMMATIONS
C

35 IF (BOTOM) 40,50,40

40 TAU= TOP/BOTOM
       GO TO 60

50 TAU=0.0

60 RETURN
       END
```

```
      SUBROUTINE SATCK (NPASS,NARAY,LEN,NBITS,MXSAT)
      DIMENSION NARAY(1)
C
C     CALCULATE SATURATION VALUE FOR THIS DATA
C
      NSAT=(2**NBITS-1)*8
C
C     CLEAR SATURATION COUNTER
C
      N=0
C
C     CHECK EACH ARRAY VALUE FOR SATURATION
C
      DO 100 I=1,LEN
      NTEST=NARAY(I)
      IF(NTEST-NSAT) 40,50,40
   40 IF(NTEST-16384) 100,50,100
   50 N=N+1
  100 CONTINUE
C
*
C     IF MORE SATURATIONS THAN ALLOWED REJECT DATA
C
      IF(N-MXSAT) 150,150,200

150 NPASS=0
      RETURN

200 NPASS=1
      RETURN
      END
*

SUBROUTINE FRWCK (NPASS,NARAY,LEN,DB)
      DIMENSION NARAY(1)

C
C     TAKE TOTAL OF ALL ELEMENTS IN ARRAY
C

NTOT=0
      DO 10 I=1,LEN
      NTOT=NTOT+IABS(NARAY(I))

10 CONTINUE
      TOTAL=NTOT

C
C     CALCULATE VALUE FOR THRESHOLD
C

EXPON=-DB/20.0
      THRSH=16384.0*10.0**EXPON
      IF(TOTAL-THRSH) 20,30,30

20 NPASS=1
      RETURN

30 NPASS=0
      RETURN
      END
      END
*
**
**
```

Two functions are basically performed by the initial computer subroutine of the program illustrated in Table I. Since no relative delay may be computed between the received signal at the remote station 12 with respect to the received signal at the remote station 14 if they are saturated, each input time sample is examined for a limiting value. This subroutine is identified in the Table by the entry "utilize SATCK to perform saturation checks". If a limiting value is detected, the program returns to the initialized subroutine and new data samples are taken from the remote stations 12 and 14. The saturation check, thus measures the number of times per data block that the sample values equal the limit values of the analog-to-digital converters 32 and 34. If the measured number of saturations exceeds an allowed number, the record is not further processed and new data blocks are accepted for processing.

Following the saturation check, another constraint which must be satisfied is that the average magnitude of the samples in each channel exceeds a threshold level as described with reference to the time domain threshold functions 82 and 84. This part of the program is identified in Table I by the entry "utilize PRWCK to perform magnitude checks". This power check is completed to insure a specified minimum signal-to-quantization noise ratio. Another function of the average power threshold is to eliminate delay estimates from being computed during dead times on the voice recording, as explained. If the received signal from the remote stations 12 and 14 do not contain sufficient energy to exceed the established threshold, the program reverts to the initialization subroutine and new data samples are taken.

If the data is accepted by the magnitude threshold check, a fast Fourier transform subroutine performs a discrete Fourier transform on the integral power of two data samples from the data link receiver 56. This subroutine is identified in the program listing of Table I by the entry subroutine CRSPC, and is detailed beginning on the third page of the listing; it may be any one of a number of commercially available subroutines. The fast Fourier transform subroutine runs such that the real and imaginary parts of the discrete Fourier coefficients overlay the original time series data after having been computed.

The time difference of arrival subroutine computes the estimate of the time delay between the channels. Estimates are computed only for those frequency components exceeding a low frequency block (filtering) and for those frequency components whose cross spectrum magnitude exceeds the cross spectrum threshold level (block 92). These levels are sketched on the curve representing the approximate power spectrum of speech signal as shown in FIG. 10. In general, the variance of a delay estimate based upon a higher frequency component is less than that based upon a lower frequency component due to an increased number of cycles present in the record length. The low frequency block precludes those frequency components with an inadequate number of cycles present in the record length from contributing to the final delay estimates.

By restricting the delay estimate to those frequency components whose cross spectrum exceeds a threshold level, there is essentially insured a minimum spot signal-to-quantization noise ratio in the frequency domain. The time difference of arrival subroutine initially obtains the magnitude of the cross spectrum of each allowable frequency component from the magnitude subroutine. If the magnitude exceeds the cross spectrum threshold value, the real and imaginary parts of the cross spectrum at that frequency are computed. A subroutine then computes a phase angle corresponding to the real and imaginary parts which is unambiguous from $-\pi$ to $+\pi$ radians. A difference estimate is then computed in the time difference of arrival subroutine (TAW) by performing a linear regression phase routine.

Figure 8:
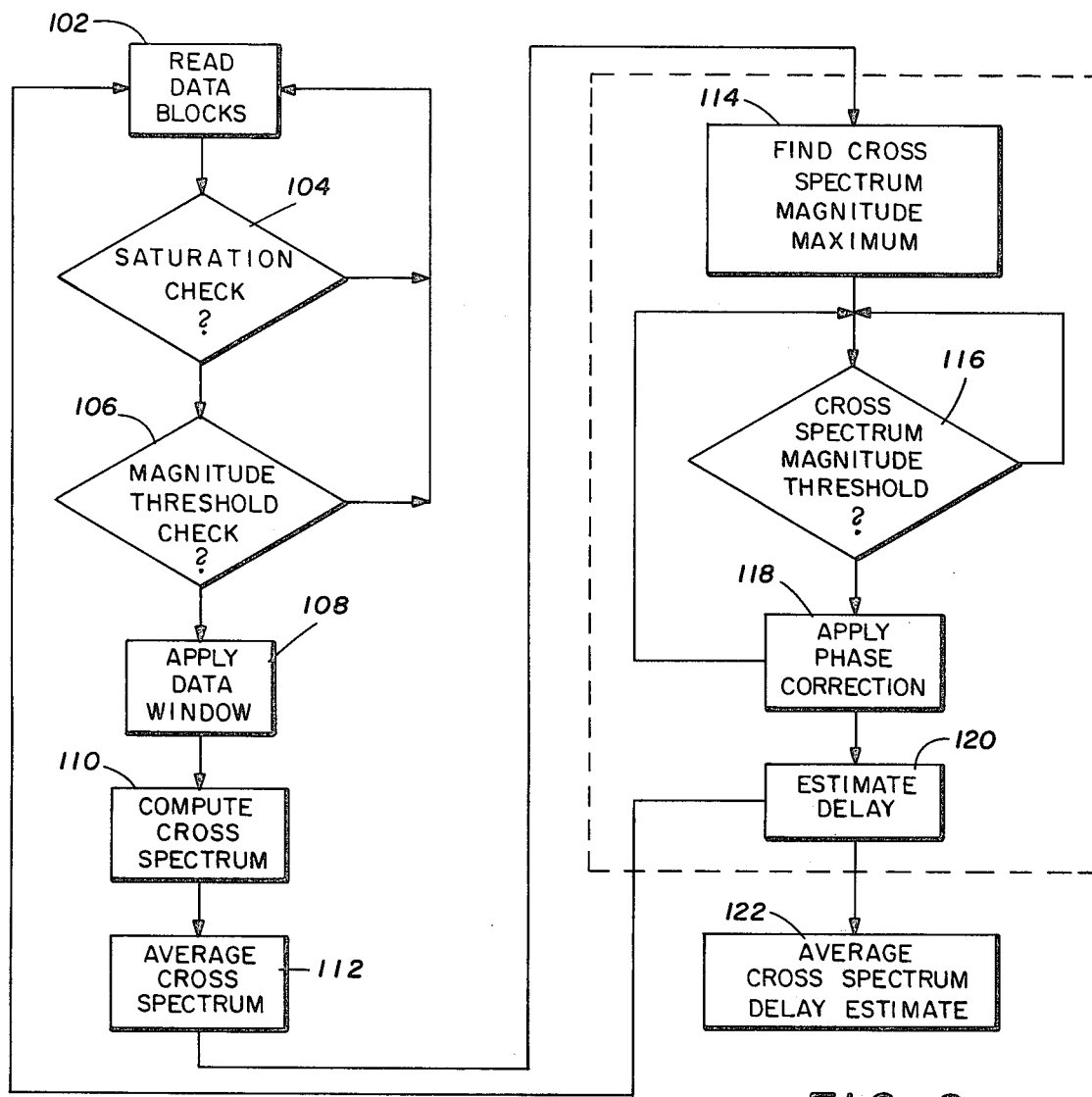
FIG. 8 is a flow chart of a delay estimation program to determine the time delay of arrival between the signal at station 1 and station 2.

A flow chart for the delay estimation program as given by the program listing of Table I is illustrated in FIG. 8 where the reference numbers do not relate to the instructions numbers in the program listing. In the initial step 102 data is read into the computer. Followng reading in the data from the remote stations 12 and 14, the saturation check step 104 is completed. A saturation condition for data samples in excess of a predetermined level returns the routine to the read data step 102. Acceptance of the data at the saturation check 104 advances the routine to the magnitude threshold check step 106 where a determination is made if the average absolute value of the data exceeds a threshold level. Failure of this test again returns the routine to the step 102. Successful completion of the magnitude threshold check 106 advances the routine to the data window step 108 following which the cross spectrum is computed as identified by the step 110. The average cross spectrum is then computed at step 112 and a single record cross spectrum delay estimate is made. This is completed by first finding the cross spectrum magnitude in step 114 which advances the program to the cross spectrum magnitude threshold inquiry step 116. Completion of the inquiry 116 advances the routine to the phase correction step 118 wherein data stored in the frequency domain calibration memory 96 is utilized by the linear regression algorithm. A single record estimate delay is then computed at the step 120 and the system returns to the read data step 102. Also, the single record estimate delay is utilized in an average cross spectrum delay estimate as identified by the reference number 122.

An important feature of the present invention is the calibration technique for each of the remote stations 12 and 14 computed prior to accepting received signals from the emitter 10. Frequency domain calibration data, as stored in the memory 96, is utilized in accordance with a program as outlined in the Fortran listing of Table II.

In the phase calibration program, the average cross spectrum of eight sets of data blocks is computed in a similar manner to that of the delay estimation program. The particular signal injected into the remote station 12 and the remote station 14 has been given as an example of a pseudo random coded signal synchronized by means of the clocks 36 and 38. The resulting spectrum consists of discrete lines spaced at periodic intervals which are subharmonics of the sampling frequency. Delay estimates for each line are computed by dividing the phase of the average cross spectrum by its frequency. Phase calibration estimates are made for all frequency components lying between the received signal spectra by linear interpolation. The phase estimates for each component of the discrete frequency spectrum are stored in the memory 96 for phase correction in the delay estimation program.

TABLE II

```
**   CALB      FORTN
     DIMENSION NWAV1(1024),NWAV2(1024),NFTR1(512),NFTI1(512)
     DIMENSION NFTR2(512),NFTI2(512),CALIB(512)
     DIMENSION SVWV1(512),SVWV2(512)
     DIMENSION WAVE1(1024),WAVE2(1024)
     DIMENSION FTR2(512),FTI2(512)
     COMMON NWAV1,NWAV2,NFTR2,NFTI2,CALIB,LEN1,LEN2,NFHSE,N
     COMMON NLLAY,LNGTH,NROUT,LONG,NEXP,INCRD,INCPT,NTRVL,NRUN
     COMMON NDUMY
     EQUIVALENCE(NWAV1(1),NFTR1(1)),(NWAV2(1),NFTI1(1))
     EQUIVALENCE(NWAV1(1),WAVE1(1)),(NWAV2(1),WAVE2(1))
     EQUIVALENCE (NFTR2(1),FTR2(1)),(NFTI2(1),FTI2(1))
     N=0
     IFS=8000
     LNGTH=1024
     LEN=LNGTH/2
     TDB=15.0
     NREC=8
     NTPVL=125
     NEXP=10
*
     ISEQ=64
     NVAL=LNGTH/ISEQ
     REWIND 2

C
C    READ REC FROM TAPE AND PROCESS
C

100 READ(2) (NWAV1(I),I=1,512)
     READ(2) (NWAV2(I),I=1,512)
     READ(2) (NWAV1(I),I=513,1024)
     READ(2) (NWAV2(I),I=513,1024)

C
C    PERFORM CROSS SPECTRAL TRANSFORM
C

CALL CRSPC

C
C    IF FIRST SET STORE IN SAVE OTHERWISE AVERAGE
C

N=N+1
     IF(N-1) 170,150,170

150 DO 160 I=1,LEN

*
     SVWV1(I)=WAVE1(I)
     SVWV2(I)=WAVE2(I)

160 CONTINUE
     GO TO 200
```

```
C
C      RUN PRESENT DATA IN SAVE ARRAYS THROUGH AVERAGING FORMULA
C      AND COMBINE WITH DATA FROM THIS PASS
C
  170 DO 180 I=1,LEN
      XNUM=WAVE1(I)+(SVWV1(I)*FLOAT(N-1))
      SVWV1(I)=XNUM/FLOAT(N)
      XNUM=WAVE2(I)+(SVWV2(I)*FLOAT(N-1))
      SVWV2(I)=XNUM/FLOAT(N)
  180 CONTINUE
C
C      CHECK TO SEE IF THIS IS LAST SET OF DATA
C
  200 IF(N-NREC) 100,205,100
C
C      CALCULATE MAGNITUDE AND PHASE FROM SUMS
*
C
  205 DO 250 I=1,LEN
      REAL=SVWV1(I)
      XIMAG=SVWV2(I)
      SVWV1(I)=SQRT(REAL**2+XIMAG**2)
      SVWV2(I)=ATAN(XIMAG/REAL)
      IF(REAL) 250,250,210

210 IF(XIMAG) 220,250,240

220 SVWV2(I)=SVWV2(I)-3.14159
      GO TO 250
  240 SVWV2(I)=SVWV2(I)+3.14159

250 CONTINUE
C
C      INTERPOLATE THE VALUES IN WAVE1
C
      CALL INTRP (SVWV2,LEN,NVAL)

C
C      PRINT DELAY VALUES
C
      RESOL=1.0/(FLOAT(LNGTH)*FLOAT(NTRVL))

*
      CALL OSTCR
      DO 290 I=1,512,16
      N=I-1
      OMEGA=2.0*3.14159*FLOAT(N)*RESOL
      DELAY=SVWV2(I)/OMEGA
      WRITE(50,260) N,DELAY

260 FORMAT(I3,5X,E15.7)

290 CONTINUE
C
C      CONVERT DATA TO MINUS FOR TAPE OUTPUT
C
      DO 300 I=1,LEN
      SVWV2(I)=-SVWV2(I)

300 CONTINUE
      REWIND 1
      WRITE(1) SVWV2
      ENDFILE  1
      REWIND 1
      STOP
      END
```

```
      SUBROUTINE INTRP (ARRAY,LEN,NVAL)
      DIMENSION ARRAY(1)
C
C     THIS ROUTINE WILL DO A LINEAR INTERPOLATION BETWEEN EACH PAIR
C     OF POINTS IN ARRAY.  THE PAIRS ARE ASSUMMED TO BE 16 ELEMENTS
C     APART -- THAT IS ELEMENTS 1,17,33,49,ETC.  THE ELEMENTS BETWEEN
C     THESE VALUES ARE TO BE REPLACED BY THE INTERPOLATED ELEMENTS
C     CALCULATED FOR EACH OF THE 15 INTERMEDIATE POINTS.
C
C     DO INTERPOLATION ON ALL OF DATA
C
      NUMBR=LEN/NVAL
      DO 100 I=1,NUMBR
C
C     CALCULATE SUBSCRIPTS OF KNOWN POINTS
*
C
      NSUB1=(I-1)*NVAL+1
      NSUB2=NSUB1+NVAL
C
*
C     CALCULATE DISPLACEMENT FOR THIS INTERVAL
C
      DISP=ARRAY(NSUB2)-ARRAY(NSUB1)
      EACH=DISP/FLOAT(NVAL)
      VALUE=ARRAY(NSUB1)
      N1=NSUB1+1
      N2=NSUB2-1
C
C     FILL IN THESE INTERPOLATION VALUES
C
      DO 50 N=N1,N2
      VALUE=VALUE+EACH
      ARRAY(N)=VALUE
   50 CONTINUE
C
*
C     TERMINATE LOOP FOR ALL INTERVALS
C
  100 CONTINUE
      RETURN
      END
      END
***
***
***
```

Figure 9:
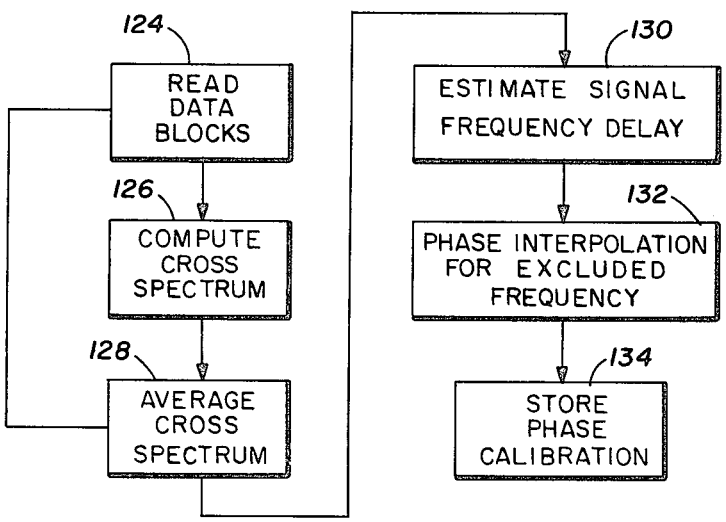
FIG. 9 is a flow chart of a phase calibration program.

Referring to FIG. 9, there is shown a flow chart for the phase calibration program as given in Table II where the reference numbers do not relate to the instruction numbers of the program listing. Initially, as indicated by the step 124, calibration data is read from each of the remote stations 12 and 14. This is indicated in Table II by the entry "read REC from tape and process". Following reading in of the calibration data, a cross spectrum computation is made at the step 126. This is defined in Table II by the entry "perform cross spectral transform". Following computation of the cross spectrum, the average of the individual cross spectrums is made by running the step 128. This part of the phase calibration program is identified in Table II by the entry "run present data in save arrays through averaging formula and combine with data from this pass".

The program is repeated to steps 124, 126 and 128 for all the calibration data. Upon completion of the averaging cross spectrum an estimate signal frequency delay subroutine 130 is completed. This is defined in Table II by the entry "calculate magnitude and phase from sum". Following estimates of signal frequency delay by step 130, the program advances to the phase interpolation for excluded frequencies as identified by the step 132. A complete listing of the interpolation subroutine is given at the end of Table II.

Following the step 132, the calibration data is stored in the frequency domain calibration memory 96. As explained, this data, when plotted gives the curve of FIG. 4.

While only one embodiment of the invention, together with modifications thereof, has been described in detail herein and shown in the accompanying drawings, it will be evident that various further modifications are possible without departing from the scope of the invention.

What is claimed is:

1. An electromagnetic wave signal correlation system comprising in combination:
   a first channel including an electromagnetic wave receiver having the signal to be correlated as an input thereto, means for generating a calibration signal as an alternate input to the receiver, and an analog-to-digital converter responsive to the output of the receiver for producing time related signal data at one clock period and calibration data at a separate clock period,
   a second channel including an electromagnetic wave receiver having a delayed replica of the signal to be correlated as an input thereto, means for generating a calibration signal as an alternate input to the receiver, and an analog-to-digital converter responsive to the output of the receiver for producing time related signal data at one clock period and calibration data at a separate clock period, and
   a collection station including means for receiving digital time related signal data and digital calibration data from the analog-to-digital converter of each channel during the separate clock periods, means for converting the time related signal data and calibration data into a frequency spectrum for each channel, and means correcting the signal data frequency spectrum from each channel with respective calibration data and for correlating the corrected frequency spectrum for each channel.

2. An electromagnetic wave signal correlation system as set forth in claim 1 including a pseudorandom frequency generator in each channel for providing the calibration signal to the respective receiver.

3. An electromagnetic wave signal correlation system as set forth in claim 2 including a clock for synchronizing the operation of the pseudorandom frequency generator and the receiver in each channel.

4. An electromagnetic wave signal correlation system as set forth in claim 1 including a transmitter in each channel having a radio frequency output carrying information related to the output of the respective analog-to-digital converter, and a receiver at the collection station responsive to the radio frequency signals from the transmitter in each channel.

5. An electromagnetic wave signal correlation system as set forth in claim 1 including:
   a pseudorandom frequency generator in each channel for providing a calibration signal,
   a calibration oscillator in each channel for providing a modulating frequency, and
   a modulator responsive to the output of the pseudorandom frequency generator and the calibration oscillator in each channel and having an output as a calibration signal to the respective receiver.

6. An electromagnetic signal correlation system, comprising in combination:
   a first channel including an electromagnetic wave receiver having the signal to be correlated as an input thereto, means for generating a calibration signal as an alternate input to the receiver, and an analog-to-digital converter responsive to the output of the receiver for producing time related signal data during one clock period and calibration data during a second clock period,
   a second channel including an electromagnetic wave receiver having a delayed replica of the signal to be correlated as an input thereto, means for generating a calibration signal as an alternate input to the receiver, and an analog-to-digital converter responsive to the output of the receiver for producing time related signal data during one clock period and calibration data during a separate clock period, and
   a collection station including means for receiving digital time related signal data and digital calibration data from the analog-to-digital converter in each channel, and an automatic digital computer programmed to:
   reject signal data from each channel below a threshold level,
   convert the signal data and calibration data by a fast Fourier transform into a frequency spectrum for each channel,
   correct the signal data frequency spectrum with the calibration data frequency spectrum for each channel, and
   correlate the corrected signal frequency spectrum of both channels into a signal output.

7. An electromagnetic wave signal correlation system as set forth in claim 6 wherein the automatic digital computer is further programmed to filter the signal frequency spectrum below a first level and above a second level.

8. An electromagnetic wave signal correlation system as set forth in claim 7 wherein the computer is further programmed to reject signal data from each channel above a saturation level of the analog-to-digital converter of each channel.

9. An electromagnetic wave signal correlation system as set forth in claim 8 including a transmitter in each channel having a radio frequency output carrying information related to the output of the respective analog-to-digital converter, and a receiver at the collection station responsive to the radio frequency output of the transmitter of each channel.

10. A method of correlating a signal and a replica thereof, comprising the steps of:
    generating calibration data during a first clock period for a first channel including a receiver and an analog-to-digital converter,
    generating calibration data during the first clock period for a second channel including a receiver and an analog-to-digital converter,
    converting a signal received at the receiver of the first channel during a second clock period into time based digital signal data,
    converting a signal received at the receiver of the second channel during the second clock period into time based digital signal data,
    converting the calibration data and signal data into the frequency spectrum, and
    correlating the frequency spectrum for each channel including the calibration data and the signal data.

11. A method of correlating a signal and a replica thereof as set forth in claim 10 wherein the step of correlation of the frequency spectrum includes correcting the signal data for each channel for each frequency with the respective calibration data.

12. A method of correlating a signal and a replica thereof as set forth in claim 10 including the step of synchronizing the operation of the first channel with the operation of the second channel.

13. A method of correlating a signal and a replica thereof as set forth in claim 10 including the step of transmitting the calibration data and signal data from each channel to a collection station for converting into the frequency spectrum and correlation of the two signals.

14. A method of correlating a signal and a replica thereof as set forth in claim 10 including the step of rejecting signal data from each channel prior to converting into the frequency spectrum below a threshold level.

15. An electromagnetic wave signal correlation system as set forth in claim 10 including the step of filtering the signal frequency spectrum below a first level and above a second level.

16. A method of correlating a signal and a replica thereof, comprising the steps of:
    generating calibration data during a first clock period for a first channel including a receiver and an analog-to-digital converter,
    generating calibration data during the first clock period for a second channel including a receiver and an analog-to-digital converter,
    converting a signal received at the receiver of the first channel during a second clock period into time based digital signal data, converting a signal received at the receiver of the second channel during the second clock period into time based digital signal data, transmitting the calibration data and signal data from each channel to a collection station, converting the calibration data and signal data into a frequency spectrum, correcting the signal data from each channel for each frequency with the respective calibration data, and correlating the frequency spectrum of the corrected signal data for each channel.

17. A method of correlating a signal and a replica thereof as set forth in claim 16 including the step of rejecting signal data from each channel prior to converting into the frequency spectrum below a threshold level.

18. A method of correlating a signal and a replica thereof as set forth in claim 17 including the step of synchronizing the operation of the first channel with the operation of the second channel.

19. A method of correlating a signal and a replica thereof, comprising in combination:

generating a pseudorandom frequency calibration signal during a first time period for a first channel including a receiver responsive to the pseudorandom frequency and an analog-to-digital converter, generating a pseudorandom frequency calibration signal during the second time period for a second channel including a receiver responsive to the calibration data and an analog-to-digital converter, converting a signal received at the receiver of the first channel during a second time period into time based digital signal data, converting a signal received at the receiver of the second channel during the second time period into time based digital signal data, converting the calibration data and signal data into a frequency spectrum, and correlating the frequency spectrum for each channel including the calibration data and the signal data.

20. A method of correlating a signal and a replica thereof as set forth in claim 19 including the step of modulating the pseudorandom frequency calibration signal prior to applying to the receiver of the respective channels.

21. A method of correlating a signal and a replica thereof as set forth in claim 19 including the step of timing the generation of the pseudorandom frequency calibration signal to coincide with a rejection by the receivers in each channel of the signal and replica thereof.

* * * * *